US012711398B1

(12) United States Patent
Bhadauria et al.

(10) Patent No.: US 12,711,398 B1
(45) Date of Patent: Aug. 18, 2026

(54) ONTOLOGY-BASED MACHINE LEARNING TRAINING/VALIDATION DATA GENERATION SERVICE

(71) Applicant: Amazon Technologies, Inc., Seattle, WA (US)

(72) Inventors: Vivek Bhadauria, Redmond, WA (US); Andrew J Jetter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1157 days.

(21) Appl. No.: 17/696,650

(22) Filed: Mar. 16, 2022

(51) Int. Cl.
*G06N 5/02* (2023.01)
*G06F 3/08* (2006.01)
(Continued)

(52) U.S. Cl.
CPC ............. *G06N 5/02* (2013.01); *G06F 16/367* (2019.01); *G06N 5/022* (2013.01);
(Continued)

(58) Field of Classification Search
CPC .......... G06N 5/02; G06N 20/00; G06N 5/022; G06N 3/088; G06F 16/367; G06F 3/08; G06F 8/436; G06F 40/284; G06F 16/9024; G06F 18/22; G06V 30/19147; G06V 30/1916
See application file for complete search history.

(56) References Cited

U.S. PATENT DOCUMENTS 10,719,301 B1 7/2020 Dasgupta et al.
12,316,610 B1 * 5/2025 Muth .................. H04L 63/0435
(Continued)

FOREIGN PATENT DOCUMENTS

CA 3163394 A1 * 7/2021 ............. G06F 40/30
WO WO-2009036555 A1 * 3/2009 ........... G06F 16/367

OTHER PUBLICATIONS

Lin et al., NPL ("Semantic Annotation for Process Models: Facilitating Process Knowledge Management via Semantic Interoperability" Published 2008 By Norwegian University Total 259 Pages (Year: 2007).*

(Continued)

*Primary Examiner* — Quoc A Tran
(74) *Attorney, Agent, or Firm* — Alexander A. Knapp; Kowert, Hood, Munyon, Rankin & Goetzel, P.C.

(57) ABSTRACT

An ontology-based annotation service is configured to receive a customer-specified ontology that describes relationships between concepts and/or categories within a given domain, such as may be used to structure a machine learning model. The ontology-based annotation service uses the customer-specified ontology to generate annotation tools and an annotation workflow for collecting annotation data in a way such that the collected annotation data conforms to the customer-specified ontology. In some embodiments, the ontology-based annotation service uses association elements to customize system supported elements to match various different customer-specified ontologies. Additionally, the ontology-based annotation service provides a knowledge tree formatted in accordance with the customer-specified ontology and populated with annotation data structured according to the customer-specified ontology.

20 Claims, 13 Drawing Sheets

(51) Int. Cl.

| | |
|---|---|
| ***G06F 8/41*** | (2018.01) |
| ***G06F 16/36*** | (2019.01) |
| ***G06F 16/901*** | (2019.01) |
| ***G06F 18/22*** | (2023.01) |
| ***G06F 40/284*** | (2020.01) |
| ***G06N 3/088*** | (2023.01) |
| ***G06N 5/022*** | (2023.01) |
| ***G06N 20/00*** | (2019.01) |
| ***G06V 30/19*** | (2022.01) |

(52) U.S. Cl.

CPC .... *G06V 30/19147* (2022.01); *G06V 30/1916* (2022.01); *G06F 3/08* (2013.01); *G06F 8/436* (2013.01); *G06F 16/9024* (2019.01); *G06F 18/22* (2023.01); *G06F 40/284* (2020.01); *G06N 3/088* (2013.01); *G06N 20/00* (2019.01)

(56) References Cited

U.S. PATENT DOCUMENTS

| | | | | |
|---|---|---|---|---|
| 2018/0052870 A1* | 2/2018 | Stojanovic | G06F 16/2322 | |
| 2020/0293712 A1* | 9/2020 | Potts | G16H 10/60 | |
| 2022/0121964 A1* | 4/2022 | Ramakrishnan | G06N 5/022 | |
| 2023/0004792 A1* | 1/2023 | de Mello Brandao | G06N 3/088 | |
| 2023/0252006 A1* | 8/2023 | Barlew | G06T 11/206 | 707/807 |

OTHER PUBLICATIONS

Martin Abadi et al, "TensorFlow: A System for Large-Scale Machine Learning", 2016, pp. 1-21.
Vijay Badrinarayanan, "SegNet: A Deep Convolutional Encoder-Decoder Architecture for Image Segmentation", Oct. 10, 2016, pp. 1-14.
Cenk Baykal et al, "Training Support Vector Machines using Coresets", Nov. 10, 2017, pp. 1-12.
Hakan Bilen et al, "Weakly Supervised Deep Detection Networks", pp. 1-9.
Leo Breiman et al, "Random Forests", 2001, (Statistics Department, University of California, Berkeley, CA 94720), pp. 1-28.
Mateausz Buda et al, "A Systematic Study of the Class Imbalance Problem in Convolutional Neural networks", pp. 1-21.
Tianqi Chen et al, "MXNet: A Flexible and Efficient Machine Learning Library for Heterogeneous Distributed Systems" Dec. 3, 2015, pp. 1-6.
Corinna Cortes et al, "Support-Vector Networks", 1995 Kluwer Academics Publishers, Boston, pp. 1-25.
Zhitao Gong et al, "Adversarial and Clean Data Are Not Twins", Apr. 17, 2017, pp. 1-7.
Greg Griffin et al, "Caltech-256 Object Category Dataset", pp. 1-20.
Tianyu Gu et al, "BadNets: Identifying Vulnerabilities in the Machine Learning Model Supply Chain", Aug. 22, 2017, pp. 1-13.
Wei Liu et al, "SSD: Single Shot MultiBox Detector", Dec. 29, 2016, pp. 1-17.
Jiajun Lu et al, "SafetyNet: Detecting and Rejecting Adversarial Examples Robustly", pp. 1-9.
Andrew McCallum et al, "Efficient Clustering of High-Dimensional Data Sets with Application to Reference Matching", 2000, pp. 1-10.
Nina Narodystka et al, "Simple Black-Box Adversarial Attacks on Deep Neural Networks", pp. 1-9.
Chris Olah et al, "Feature Visualization", Nov. 7, 2017, pp. 1-24.
Nobuyuki Otsu, "A Threshold Selection Method from Gray-Level Histograms", Jan. 1, 1979, pp. 1-5.
Nicolas Papernot et al, "Sok: Security and Privacy in Machine Learning", pp. 1-16.
Abhishek Patel et al, "New Approach for K-mean and K-medoids Algorithm", (International Journal of Computer Applications Technology and Research vol. 2—Issue 1, 1-5), dated 2013, pp. 1-5.
Fabian Pedregosa et al, "Scikit-Learn: Mahcine Learning in Python", 2011, pp. 1-6.
John C. Platt, "Probabilistic Outputs for Support Vector Machines and Comparisons to Regularized Likelihood Methods", Mar. 26, 1999, pp. 1-11.
Matthew Honnibal et al, "Prodigy: A new tool for radically efficient machine teaching", (https://explosion.ai/blog/prodigy-annotation-tool-active-learning), pp. 1-13.
Marco Tulio Ribeiro et al, "Why Should I Trust You? Eplaining the predictionsof any classifier", Aug. 9, 2016, pp. 1-10.
Olga Russakovsky et al, "ImageNet Large Scale Visual Recognition Challenge", Jan. 30, 2015, pp. 1-43.
Daniel Smilkov et al, "SmoothGrad: removing noise by adding noise", Jun. 12, 2017, pp. 1-10.
Chen Sun et al, "Revisiting Unreasonable Effectiveness of Data in Deep Learning Era", pp. 1-10.
Christian Szegedy et al, "Intriguing properties of neural networks", Feb. 19, 2014, pp. 1-10.
Christian Szegedy et al, "Inception-v4, Inception-RestNet and the Impact of Residual Connections on Learning" 2017, pp. 1-7.
Christian Szegedy et al, "Rethinking the Inception Architecture for Computer Vision", pp. 1-9.
Sely Tokui et al, "Chainer: a Next-Generation Open Source Framework for Deep Learning", pp. 1-6.
Laurens van der Maaten, "Visualizing Data using t-SNE", 2008, pp. 1-27.
Pete Warden et al, "Speech Commands: A Dataset for Limited-Vocabulary Speech", Apr. 9, 2018, pp. 1-11.
U.S. Appl. No. 16/172,614, filed Oct. 26, 2018, Sunny Dasgupta, et al.
U.S. Appl. No. 16/172,637, filed Oct. 26, 2018, Sunny Dasgupta et al.

* cited by examiner

Ontology-Based Annotation Service 102

Supported Structural Elements 104

Mapping Module (optional) 106

Ontology

Model Configuration Interface 108

Annotation Tool Generator 110

Annotation Workflow Generator 112

Annotation Execution Service 114

Annotation Data Storage 116

Model Generation Module 118

Ontology for ML Model

User(s) 120

Populated Knowledge Tree 126

ML Service/ML Development Environment 124

Annotators 122

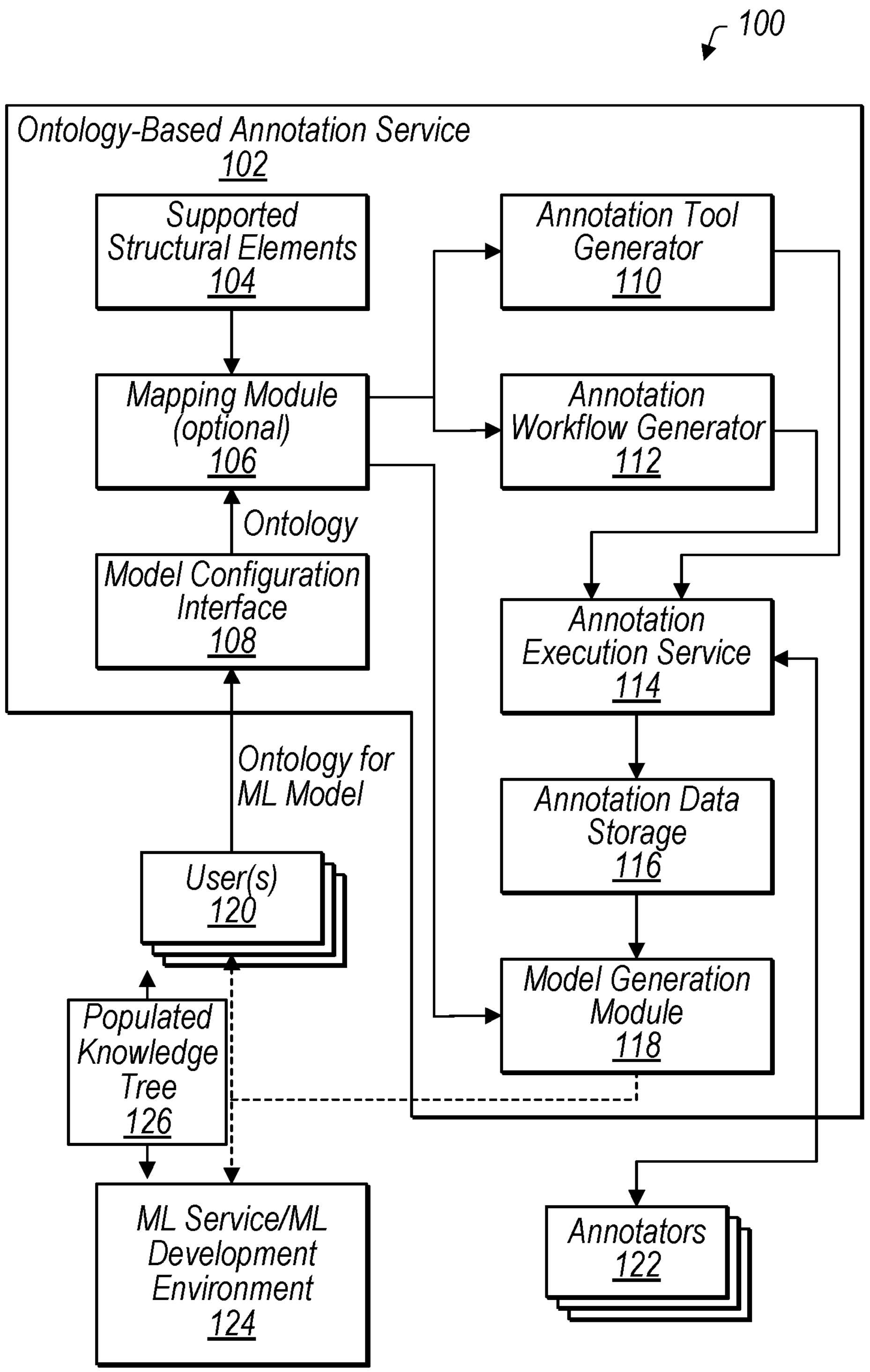

FIG. 1

ONTOLOGY-BASED MACHINE LEARNING TRAINING/VALIDATION DATA GENERATION SERVICE

BACKGROUND

Machine learning models may be structured such that relationships between model elements follow an ontology that is meaningful to a particular type of data being analyzed, or a particular type of machine learning problem being solved. Generally speaking, an ontology describes relationships between a set of concepts and/or categories within a given domain. Also, an ontology may define types of properties that may be associated with the concepts or categories that are related according to the relationships of the ontology. For example, the concepts or categories of an ontology may be organized as structural elements of the ontology, where the ontology defines relationships between the structural elements and defines available properties that may be assigned to the structural elements of the ontology.

Also, machine learning models require training data and/or validation data to train and/or validate machine learning models. For example, training a machine learning model may require the use of information that has been labeled with labels that are known (or otherwise deemed) to be correct. However, generating training data and/or validation data may be a time-consuming process, often involving repetitive tasks. Additionally, data for use in training and/or validation of a machine learning model may be collected and/or labeled using a first ontology, whereas the machine learning model is structured using a different ontology. Such a mismatch between ontological models may add further complexities to the process of generating training and/or validation data for a machine learning model.

BRIEF DESCRIPTION OF DRAWINGS

FIG. 1 is a block-diagram illustrating an ontology-based annotation service that receives a customer-specified ontology to be used for a machine learning model, and that generates training and/or validation data (e.g., annotation data) for the machine learning model that is organized according to the customer-specified ontology, according to some embodiments.

Figure 2:
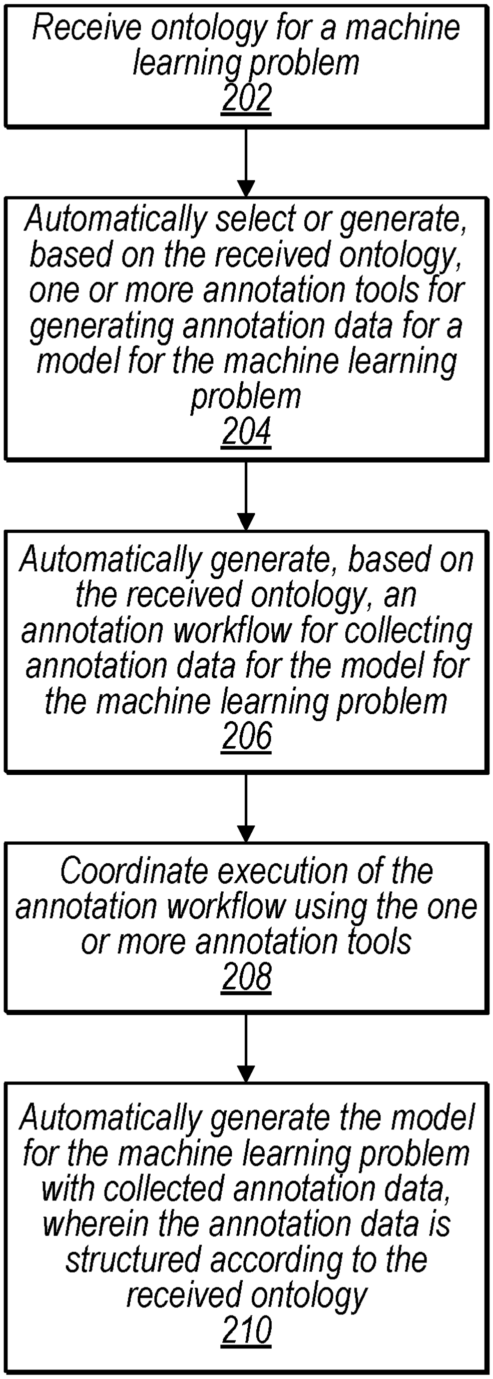
FIG. 2 is a flow diagram illustrating a process for automatically generating, by the ontology-based annotation service, annotation tools and an annotation workflow based on a customer-specified ontology, and further coordinating collection of annotation data using the generated annotation tools and annotation workflow, wherein a model having the customer-specified ontology is generated using the collected annotation data, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure implement an ontology-based annotation service that may be used to generate annotation data organized according to a customer-specified ontology, according to the various embodiments.

As discussed above, the concepts or categories of an ontology may be organized as structural elements of the ontology, where the ontology defines relationships between the structural elements and defines available properties that may be assigned to the structural elements of the ontology. For example, an ontology for an office document may define a page as a structural element of the ontology that has a relationship with other structural elements of the ontology, such as lines of text. For example, a relationship defined by the ontology may be that lines of text are contained within a page. Additionally, words may be defined in the ontology as an additional structural element of the ontology, where words have a structural relationship with lines of texts such that words are contained within lines of text. Continuing the example, structural elements of the ontology, such as lines of text may have properties, such as a full line of text or a partial line of text, where a length of a line of text may be dependent on a page size, which may be a property of another structural element of the ontology, such as the page. Additional such properties and relationships may make up an ontology for describing concepts and relationships that organize information, such as office documents.

In some embodiments, instead of a customer being required to custom develop annotation workflows and annotation tasks that follow a model ontology preferred by the customer in order to generate annotation data, the customer may instead provide a customer-defined ontology to an ontology-based annotation service, and the service may automatically generate annotation tools and annotation workflows for collecting annotation data structured in accordance with the customer-specified ontology. Additionally, whereas the example ontology described above for an office document was specific to documents that are formatted as pages comprising lines that comprise words, an ontology-based annotation service may include system supported structural elements that may be mapped to various types of ontologies, wherein some (but not necessarily all) system supported structural elements are used to generate a knowledge tree that mirrors a customer-specified ontology. For example, a single ontology-based annotation service may support generation of annotation workflows and annotation tools for various different types of ontologies that are used in various different domains. For example, a non-exhaustive list of domains for which an ontology-based annotation service may be configured to generate annotation workflows and annotation tools may include: 2D image labeling, 2D document labelling, 3D scene labelling, 3D point-cloud object labelling, audio labelling, and/or other types of data labelling projects.

In contrast to other types of data labeling tools that are not specific to a particular ontology, an ontology-based annotation service may use a customer-specified ontology to guide the selection of annotation tools and an annotation workflow. For example, other data labeling tools often provide user interfaces that are designed in an open-ended manner, wherein the user interface design is not constrained by any particular ontological model. In such cases, annotation data collected using user interfaces of such other data labeling tools often does not conform to a customer preferred ontology. For example, a customer specified ontology, may define lines as being contained in a 2D geometry bounding box. However, a typical data labeling tool may allow an annotator to draw a 2D geometry bounding box around a word in a line. As can be seen in this example, in the customer's preferred ontology lines are contained within 2D geometry bounding boxes, whereas in an ontology of the collected annotation data, 2D geometry bounding boxes can be found within a line of text. This mis-match in ontology frustrates straightforward use of the collected annotation data. For example, software engineers may be required to write customized integration scripts to integrate the annotation data collected by such data labelling tools into a translated version of the annotation data that conforms to the structure of the given ontology, such as an ontology preferred by a customer. However, in contrast, an ontology-based annotation service may purposefully select annotation tools and annotation workflows for collecting annotation data such that the collected annotation data is generated in a structure that conforms to the customer-specified ontology without the need for software engineers to custom-design integration scripts, as if often the case with other data labeling tools. Also, it should be pointed out that an ontology-based annotation service can generate annotation tools and annotation workflows that correspond with a plurality of different customer-specified ontologies. This can be contrasted with a problem-specific annotation tool that is custom designed for a particular ontology, but is not flexible, in that it cannot be used to gather annotation data structured according to other ontologies.

As an example of a set of annotation tasks that may be included in an annotation workflow, a given annotator may be given an image and a first annotation task may be to determine if there is, for example, a cat in the image. A second annotation task may be to indicate where the cat is located in the image. Annotation workflows often comprise multiple such granular annotation tasks that are typically managed via a static workflow, where the workflow is custom designed for the given project being performed (e.g., customized to a specific ontology and/or medium). However, custom-designing, e.g., hand-curating, such workflows is costly and difficult to change and/or manage. Thus, as an alternative to using hand-curated workflows, developers of machine learning models may instead use an ontology-based annotation service to build an annotation workflow comprising annotation tasks that conform to a customer-specified ontology. For example, instead of needing to hand curate a workflow, a developer of a machine learning model may only need to design or select an ontology to be used for the developer's machine learning model and offload the tasks of building annotation tools and annotation workflows to an ontology-based annotation service. The ontology-based annotation service may then return a populated model (such as a populated knowledge tree) comprising annotated ground truth data that is formatted in accordance with the customer-specified ontology. Additionally, in some embodiments, the customer may specify only a subset of the ontology nodes in the customer-specified ontology for which annotation data is to be collected. Thus, the customer may select a specified ontology and further specify a subset of the nodes of the customer-specified ontology for which annotation data is to be generated/collected. In response, an ontology-based annotation service may generate an annotation workflow and annotation tasks for collecting annotation data only for the customer specified nodes of the customer-specified ontology.

In some embodiments, a workflow generated by an ontology-based annotation service may be formatted as a directed acyclic graph (DAG) wherein nodes of the DAG correspond to annotation tasks to be performed. In some embodiments, the DAG may be structured in accordance with the customer specified ontology. In some embodiments, an execution service of an ontology-based annotation service (or an execution service that is a separate service) may iterate through the nodes of the DAG to collect annotation data formatted in accordance with the customer-specified ontology.

In some embodiments, an ontology-based annotation service may generate annotations for data provided for analysis. In some embodiments, the data to be annotated may be termed an "asset", for example an asset may comprise data to be fed to a machine learning model. Also, the annotation results may comprise metadata describing an asset, such as labels associated with items included in the asset, such as in the example of office documents, labels indicating words, lines, bounding boxes, etc. In some embodiments, multiple sets of annotation data for assets may be consolidated to form a "ground truth" that may be used to train (or validate) a machine learning model.

In some embodiments, annotation data and/or consolidated annotation data making up a ground truth may be stored in one or more databases. For example, a tier-1 database may be used to store the annotation data. In some embodiments, a top tier (e.g., tier-1) database may store data objects using a key-value data structure. In some embodiments, a top tier database may be contrasted with lower tier databases based on guarantees for data durability and/or accessibility. For example, in some embodiments, a tier-1 (e.g., top tier) database may provide a service level agreement guarantees that data is available 99.999% of the time or greater (e.g., 5 9s availability) or is durable above a certain threshold, such as 5 9s durability or an even higher level of durability. In some embodiments, a second lower tier database, (that doesn't necessarily guarantee 5 9s or equivalent accessibility/durability) may be used to analyze annotation data. For example, a first copy of the annotation data may be durably stored in a top-tier database, such as a NoSQL database, and a second copy of the annotation data may be loaded in another database, such as a graphical database for analysis. For example, a graphical database (as compared to a relational database) may use graph structures to organize relationships between data objects. For example, a graphical database may organize data according to a directed acyclic graph (DAG) that represents a customer-specified ontology.

In some embodiments, an ontology may be provided to an ontology-based annotation service in a shape constraint language, such as SHACL. In some embodiments, a populated model (e.g., generated knowledge tree), comprising annotation data that is structured according to the customer-specified ontology may be returned in a format that uses linked data object notation, such as in a JSON-LD format (Java Script Object Notation-Linked Data). In some embodiments, a customer may define an ontology to be used using a graphical user interface, wherein the ontology-based annotation service (or other related service of a service provider network) generates a shape constraint language file representing the customer-specified ontology based on inputs received from the customer via the graphical user interface. In some embodiments, an ontology-based annotation service, may receive an annotation project with an associated ontology defined in a shape constraint language (e.g., SHACL), collect annotation data and populate a model with JSON-LD data, store the JSON-LD data in a tier-1 database, such as a key-vale NoSQL database, and present the annotation data to a customer for analysis via a graphical-database. The ontology-based annotation service may further integrate with a machine learning service and provide the JSON-LD data for use in training or validating a machine learning model. For example, the ontology-based annotation service may provide ground truth information to a machine learning service that is structured as a knowledge tree having a customer-specified ontology and that is formatted as JSON-LD data. The machine learning service may then use the ground truth information to train or validate a given machine learning model formatted using the same ontology as was provided to the ontology-based annotation service for use in generating the ground truth information.

Example Ontology-Based Annotation Service

FIG. 1 is a block-diagram illustrating an ontology-based annotation service that receives a customer-specified ontology to be used for a machine learning model, and that generates training and/or validation data (e.g., annotation data) for the machine learning model that is organized according to the customer-specified ontology, according to some embodiments.

Figure 5:
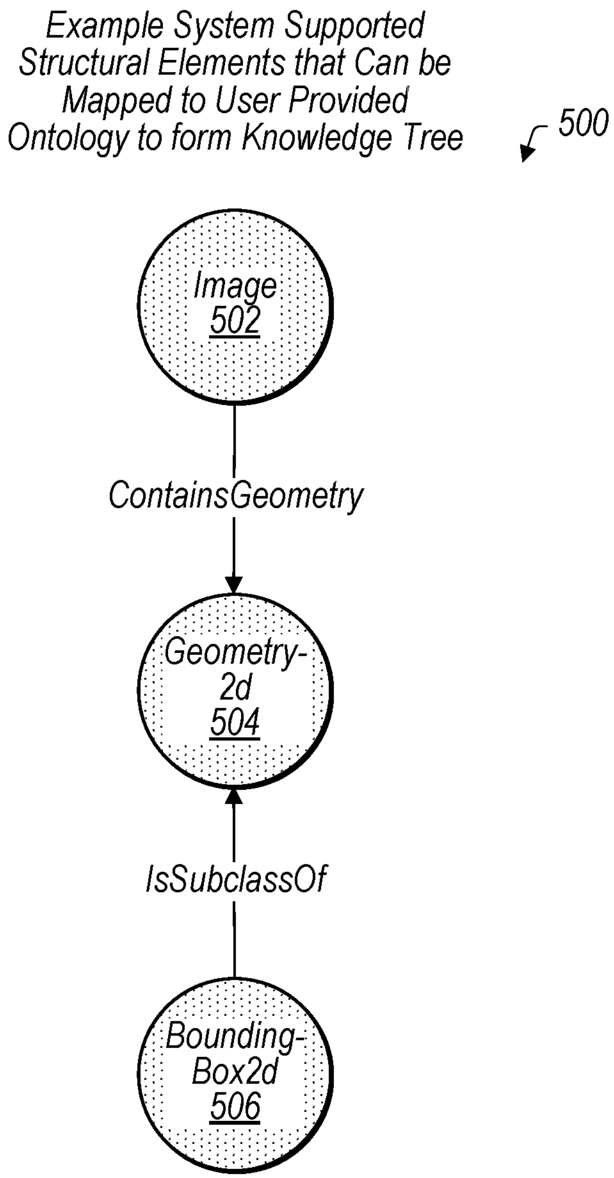
FIG. 5 illustrates example structural elements supported by the ontology-based annotation service (e.g., system supported structural elements), wherein the system supported structural elements are configured to be mapped to elements of the customer-specified ontology, according to some embodiments.
Figure 6:
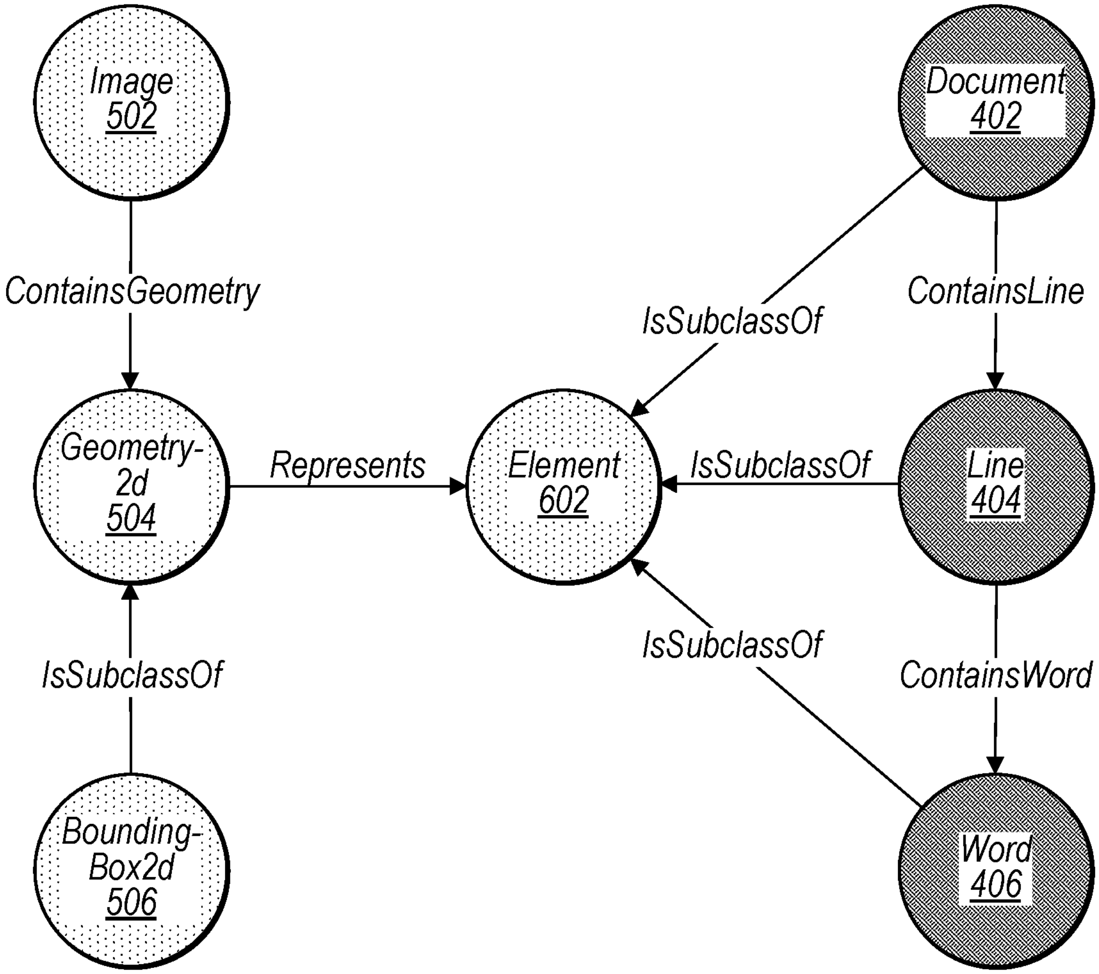
FIG. 6 further illustrates the automatic mapping, by the ontology-based annotation service, of the elements of the customer-specified ontology to the system supported structural elements of the ontology-based annotation service, according to some embodiments.

In some embodiments, an ontology-based annotation service, such as ontology-based annotation service 102, may be included in a service provider 100 network. Also, the ontology-based annotation service 102 may include a user interface, such as a model configuration interface 108, which may be implemented via an application programmatic interface (API). The model configuration interface 108 may be configured to receive a customer-specified ontology and/or other customer specified parameters (e.g., formatted in accordance with the API) from users 120 to be used to generate an annotation workflow for collecting annotation data for the users 120, such as to generate a knowledge tree that corresponds to a machine learning model specified by a customer of the ontology-based annotation service 102, such as one or more of users 120. Additionally, ontology-based annotation service 102 may include a repository of supported structural elements 104. For example, system supported structural elements may be used to form a knowledge tree customized to a customer-specified ontology and are further discussed in FIG. 5. For example, FIG. 5 illustrates some system supported structural elements that may be used. Also, ontology-based annotation service 102 includes optional mapping module 106 that receives a customer-specified ontology from model configuration interface 108 and then arranges system supported structural elements of repository 104 into a mapping for a knowledge tree that conforms to the customer-specified ontology. For example, FIG. 6 illustrates an example mapping of system supported structural elements to form a knowledge tree that corresponds to a customer-specified ontology. The generated knowledge tree is provided to annotation tool generator 110 and annotation workflow generator 112 of ontology-based annotation service 102. Additionally, the generated knowledge tree is provided to model population module 118. In some embodiments, the mapping between the customer provided ontology and the supported structural elements of the service may be automatically performed via mapping module 106. Also, in some embodiments, the customer-specified ontology may further include mapping information to map the structural elements of the customer-specified ontology to supported structural elements of the service (e.g., the mapping may have already been performed by user 120). In some embodiments, the mapping may involve mapping structural elements of a first ontology (e.g., the customer specified ontology) to a second ontology (e.g., an ontology the supported structural elements 104).

Figure 7:
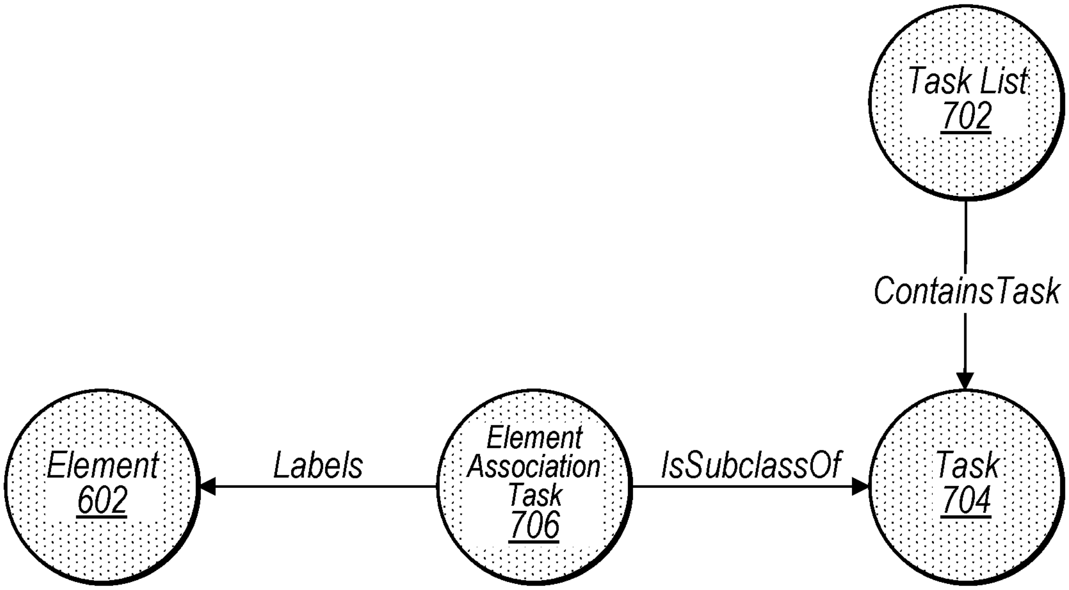
FIG. 7 further illustrates a process of mapping system supported structural elements (e.g., that may be used in a knowledge tree generated based on a customer specified ontology) to tasks of a list of tasks supported by the ontology-based annotation service (e.g., system supported tasks), according to some embodiments.
Figure 8:
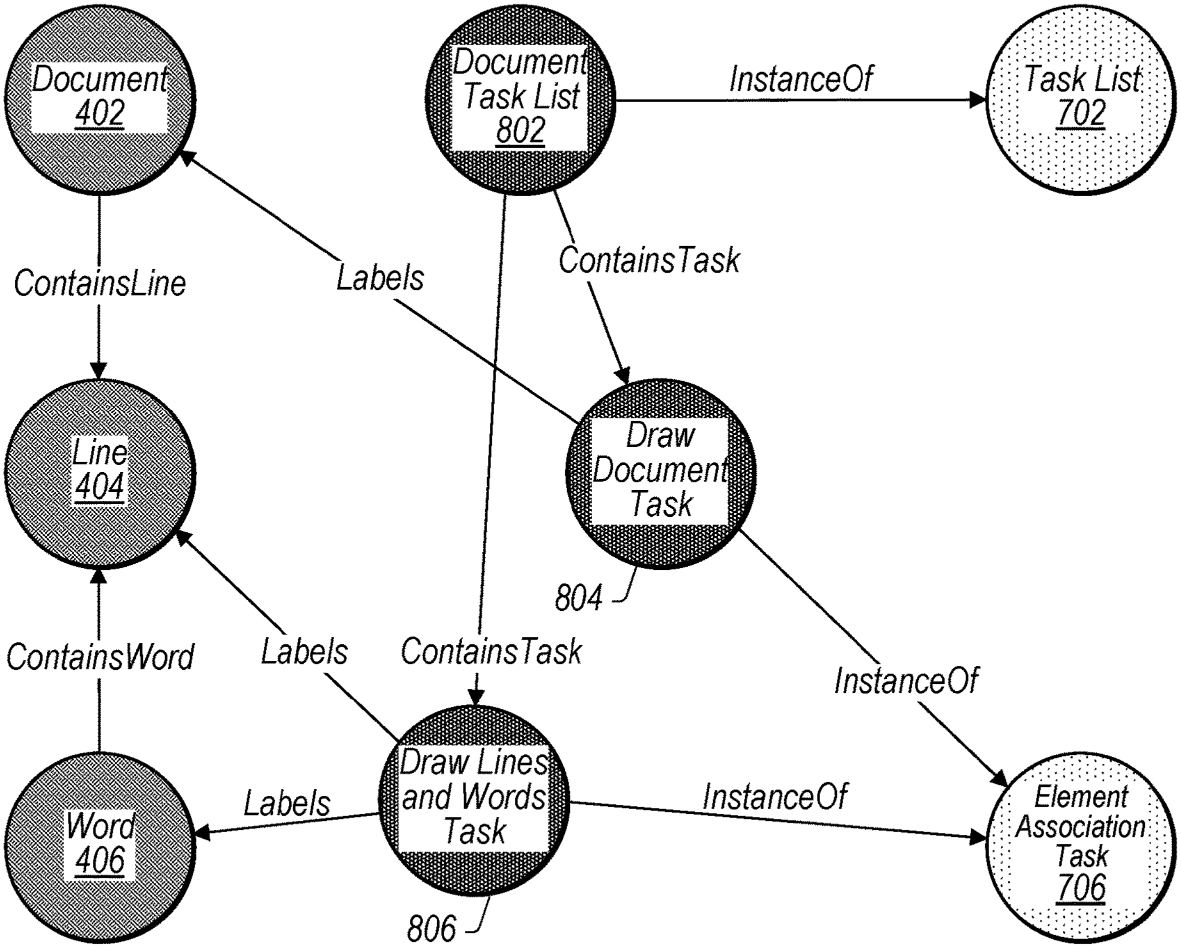
FIG. 8 further illustrates an example mapping of system supported tasks to the elements of the customer-specified ontology in order to generate an annotation workflow in accordance with the customer-specified ontology, wherein the annotation workflow uses annotation tools (e.g., that perform system supported tasks) that generate annotation data in accordance with the customer-specified ontology, according to some embodiments.

The annotation tool generator 110 maps annotation tasks from a list of supported annotation tasks to the elements of the knowledge tree to generate annotation tools for collecting annotation data. An example of such mapping is shown in FIG. 7. Additionally, the annotation workflow generator 112 generates a workflow, such as a directed acyclic graph (DAG), comprising annotation tasks to be performed to collect annotation data formatted in accordance with the customer-specified ontology. For example, FIG. 8 illustrates an example annotation workflow.

Figure 9:
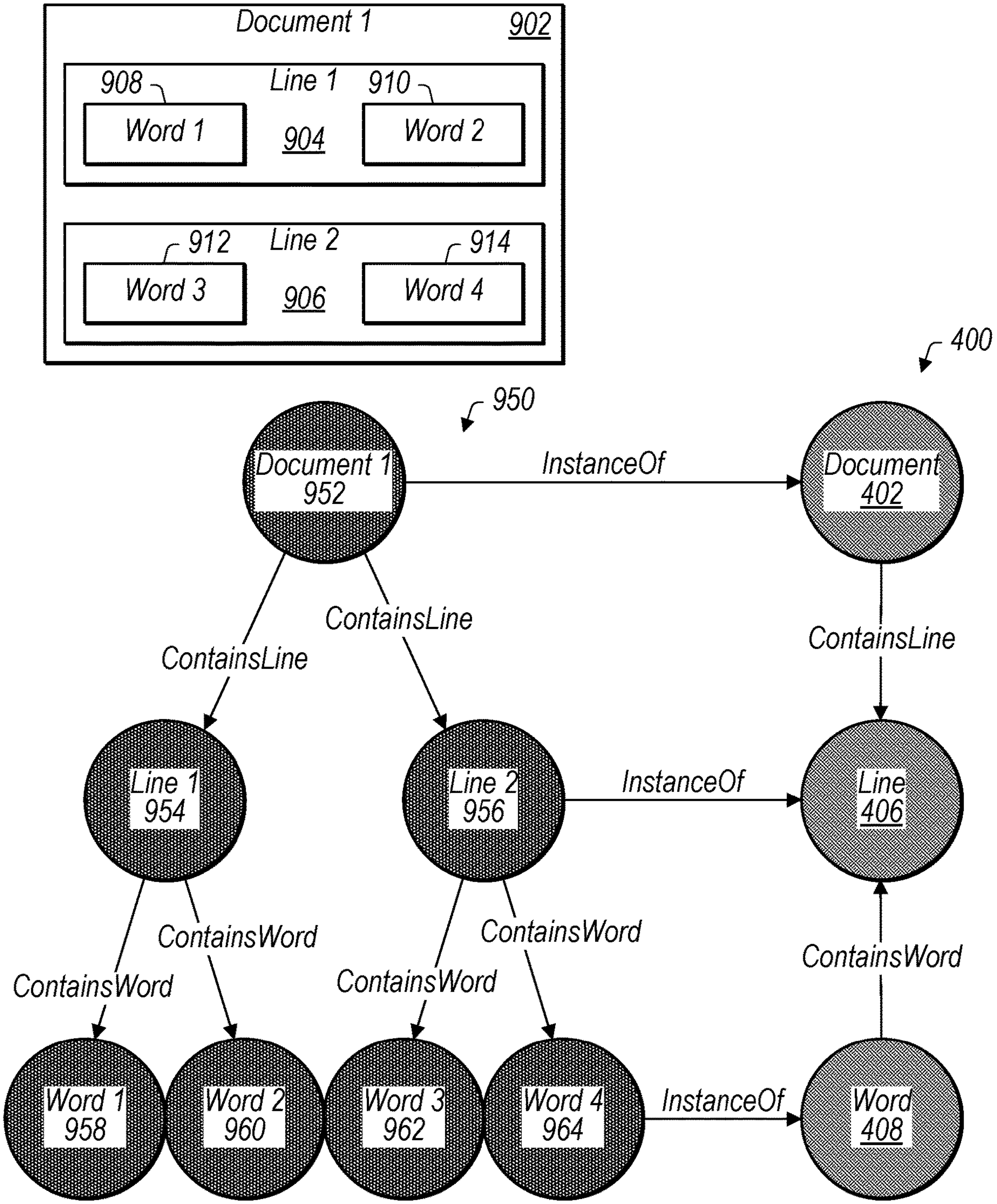
FIG. 9 further illustrates generating a model that follows the customer-specified ontology with the collected annotation data formatted in accordance with the customer-specified ontology, according to some embodiments.
Figure 10:
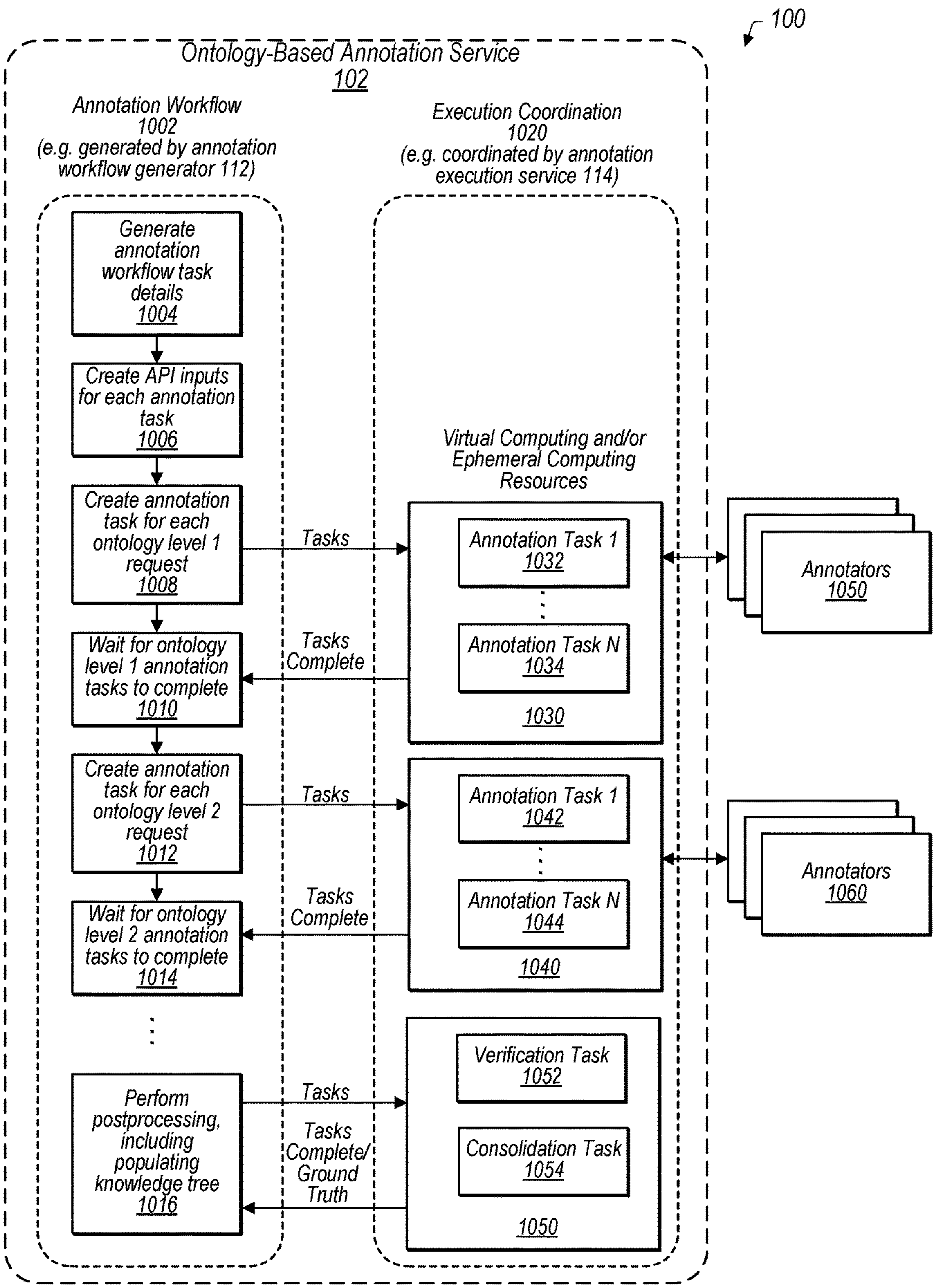
FIG. 10 illustrates an example execution of an annotation workflow generated by an ontology-based annotation service to collect annotation data formatted in accordance with the customer-specified ontology, according to some embodiments.

Annotation execution service 114, then executes the annotation workflow generated by annotation workflow generator 112 using annotation tools selected (or generated) by annotation tool generator 110. The annotation execution service may use ephemeral virtualized computing resources to implement the annotation tools and to present the annotation tools to annotators 122. The annotators may generate annotation data that is formatted in accordance with the customer-specified ontology The format may be guaranteed by the workflow design that was designed taking into account the customer-specified ontology. For example, FIG. 10 illustrates an example execution of an annotation workflow generated by annotation workflow generator 112 and FIG. 9 illustrates an example set of annotation data formatted in accordance with a customer-specified ontology, along with an example annotation tool that is formatted in accordance with the customer-specified ontology and that is used to collect the properly formatted annotation data.

Model population module 118 may organize the collected annotation data into a format in accordance with a knowledge tree generated based on the customer-specified ontology. In some embodiments, a populated knowledge tree 126 may be provided to users 120 and/or to a machine learning service or machine learning development environment 124.

In some embodiments, the ontology provided to the model configuration interface 108 by users 120 may be formatted using a shape constraint language, such as SHACL. In some embodiments, the returned populated knowledge tree 126 may comprise annotation data formatted using a linked data object notation, such as JSON-LD.

FIG. 2 is a flow diagram illustrating a process for automatically generating, by the ontology-based annotation service, annotation tools and an annotation workflow based on a customer-specified ontology, and further coordinating collection of annotation data using the generated annotation tools and annotation workflow, wherein the model is generated using the collected annotation data having the customer-specified ontology, according to some embodiments.

At block 202, an ontology-based annotation service receives an ontology, such as for a machine learning problem. At block 204, the ontology-based annotation service automatically selects or generates, based on the received ontology, one or more annotation tools for generating annotation data for a model for the machine learning problem. For example, the annotation tools may be selected from a set of supported annotation tasks or may be custom generated. Also, at block 206, the ontology-based annotation service automatically generates based on the received ontology, an annotation workflow for collecting annotation data for the model for the machine learning problem.

At block 208, the ontology-based annotation service (or a co-service offered by a service provider 100) coordinates execution of the annotation workflow using the generated annotation tools that match the customer specified ontology.

At block 210, the ontology-based annotation service automatically populates the model for the machine learning problem with collected annotation data, wherein the annotation data is structured according to the received ontology.

Figure 3:
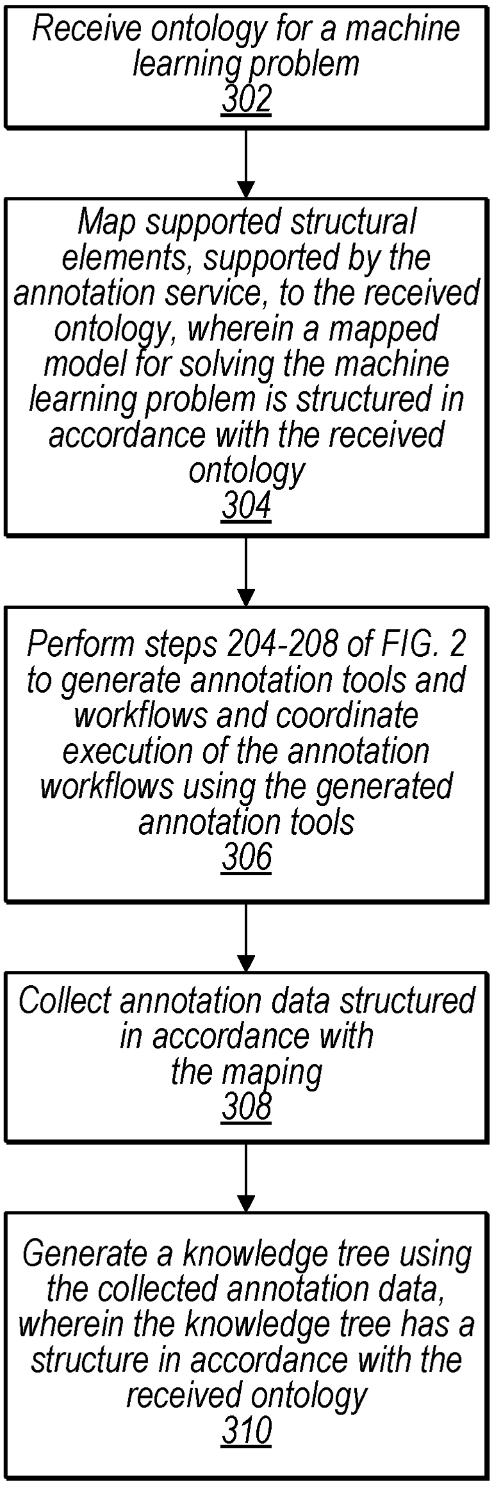
FIG. 3 is a flow diagram illustrating a process, automatically performed by the ontology-based annotation service, that further includes mapping structural elements supported by the annotation service to structural elements of the customer-specified ontology and generating a knowledge tree with the collected annotation data, wherein knowledge tree is formatted in accordance with the customer-specified ontology, according to some embodiments.

FIG. 3 is a flow diagram illustrating a process, automatically performed by the ontology-based annotation service, that further includes mapping structural elements supported by the annotation service to structural elements of the customer-specified ontology and generating a knowledge tree with the collected annotation data, wherein the knowledge tree is formatted in accordance with the customer-specified ontology, according to some embodiments.

In some embodiments, at block 302, an ontology-based annotation service receives an ontology for a machine learning problem. At block 304, the ontology-based annotation service maps structural elements supported by the annotation service to structural elements of the received customer-specified ontology. The model that will be populated by the ontology-based annotation service is also formatted in accordance with the customer-specified ontology and the annotation tools and workflows selected by the ontology-based annotation service are in conformance with the customer-specified ontology. For example, at block 306 annotation tools and annotation workflows for generating a knowledge tree structure conforming to the customer-specified ontology are generated in a similar manner as described for blocks 204 through 208 of FIG. 2.

At block 308, the ontology-based annotation service collects annotation data structured in accordance with the customer-specified ontology by presenting the generated annotation tools to annotators according to the generated annotation workflow. In some embodiments, the annotators may be people that perform the annotation. However, in some embodiments some (or all) annotation tasks may be automated.

At block 310, the ontology-based annotation service generates a knowledge tree with the collected annotation data having respective formats corresponding to formats of the structural elements of the knowledge tree that conform to the customer-specified ontology.

Figure 4:
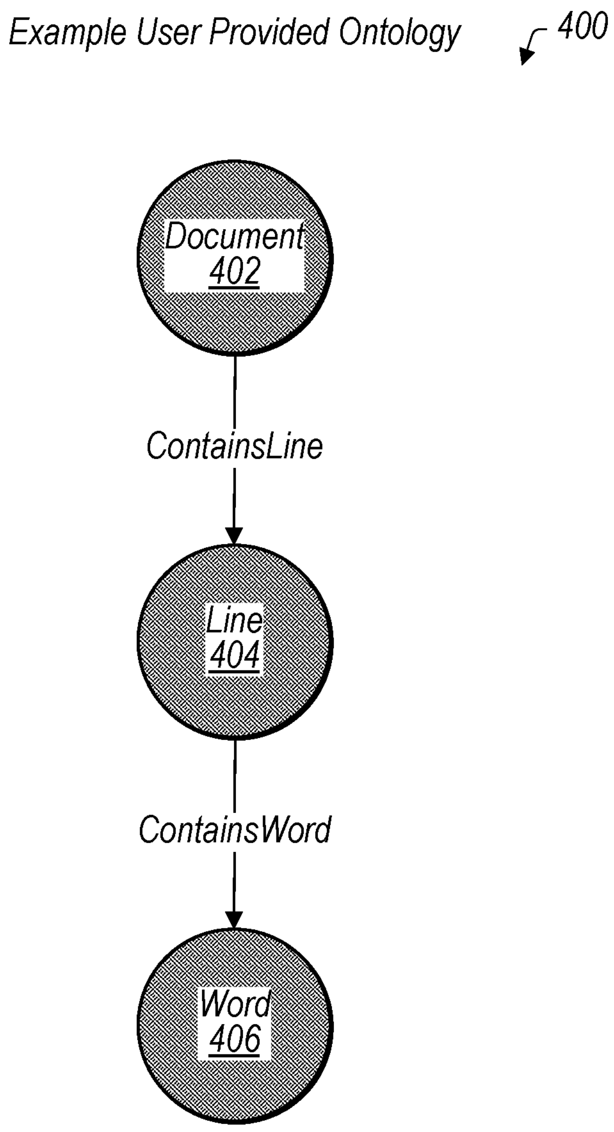
FIG. 4 illustrates an example customer-specified ontology that may be provided to an ontology-based annotation service, according to some embodiments.

FIG. 4 illustrates an example customer-specified ontology 400 that may be provided to an ontology-based annotation service, according to some embodiments.

For example, a customer specified ontology 400 for labelling a document may include structural elements, such as document 402, which contains lines 404, which contains words 406. Such an ontology 400 may define relationships between documents, lines, and words. It may also be used by an ontology-based annotation service to collect annotation data that conforms to the customer-specified ontology 400. In some embodiments, an ontology-based annotation service may generate a knowledge tree that conforms to the customer specified ontology wherein a document can contain multiple lines and each line can contain multiple words. Note that words may be arranged in the knowledge tree as constituent members of lines (for example as opposed to being directed linked to the document without residing in a line) such that the knowledge tree conforms to the customer-specified ontology 400.

FIG. 5 illustrates example structural elements 500 supported by the ontology-based annotation service (e.g., system supported structural elements), wherein the system supported structural elements are configured to be mapped to elements of the customer-specified ontology, according to some embodiments.

In some embodiments, an ontology-based annotation service may include standard classes of supported structural elements 500 such as image 502, geometry 2D 504, bounding box 2D 506, and association elements, such as element 602 (shown in FIG. 6), amongst various other system supported structural elements.

FIG. 6 further illustrates the automatic mapping, by the ontology-based annotation service, of the elements of the customer-specified ontology to the system supported structural elements of the ontology-based annotation service, according to some embodiments.

As shown in FIG. 6, the system supported structural elements may be extended based on the customer-specified ontology by mapping association elements 602 to elements of the customer-specified ontology. For example, the system supported structural elements specify that an image 502 contains geometries, such as a 2D geometry 504 and a bounding box 2D 506 is a sub-class of a geometry 2D 504. Also, the geometry 2D 504 of the system supported structural elements can be used to represent an element of a customer-specified ontology via association element 602. Additionally, different instances of association elements 602 may be used to define different sub-classes of different structural elements of a customer-specified ontology. For example, respective 2D geometries in an image 502 are assigned properties, such as being associated with a particular association element 602, wherein different association elements 602 are mapped to different structural elements of the customer-specified ontology. For example, different instance of 2D geometries 504 that are linked to different association elements 602 are mapped to different elements of the customer-specified ontology that are subclasses of a document 402, subclasses of a line 404, or subclasses of a word 406. Thus, the geometry 2D structural element 504 of the system supported structural elements 500 may be used to define a knowledge tree having an ontology that matches the customer-specified ontology 400 by linking different 2D geometries 504 in the image 502 to different association elements 602 that are in turn defined as subclasses of respective elements of the customer specified ontology, such as lines 404, and words 406 of customer-specified ontology 400. For example, the customer specified ontology constraints can be mapped to different association elements 602, each of which can be represented using the system supported structural element of a 2D geometry 504.

FIG. 7 further illustrates a process of mapping system supported structural elements (e.g., that may be used in a knowledge tree generated based on a customer specified ontology) to tasks of a list of tasks supported by the ontology-based annotation service (e.g., system supported tasks), according to some embodiments.

As further shown in FIG. 7, different instances of association elements 602 can be associated with different tasks 704 via an element association task. Also, the tasks 704 may be selected from system supported tasks, such as may be included in task list 702. For example, different tasks 704 may be associated with different association elements 602 to perform different labeling operations with regard to the different ones of the association elements 602, each of which may be linked to a system supported structural element, such as a geometry 2D 504.

FIG. 8 further illustrates an example mapping of system supported tasks to the elements of the customer-specified ontology in order to generate an annotation workflow in accordance with the customer-specified ontology, wherein the annotation workflow uses annotation tools (e.g., that perform system supported tasks) that generate annotation data in accordance with the customer-specified ontology, according to some embodiments.

In FIG. 8 the specific annotation tasks that are to be performed for elements of a customer-specified ontology are shown. For example, a document task list 802 specific to images that are documents, such as document 402, may be a particular instance of a task list 702 and may use a sub-set of system supported annotation tasks, such as draw document task 804 and draw lines and words task 806. The draw documents task 804 may label document 402, where element association task 706 maps (e.g., represents) image 502 as representing a document 402. Also, draw lines and words tasks 806 may label lines 404 and words 406 which are represented by 2D geometries 504 via element association task 706. For example, an annotation tool 902 as shown in FIG. 9 may be generated using the mapping (e.g., generated knowledge tree) of FIG. 8.

FIG. 9 further illustrates populating a model that follows the customer-specified ontology with the collected annotation data formatted in accordance with the customer-specified ontology, according to some embodiments.

For example, annotation tool 902 may be generated and presented to annotators 122 to label lines 406 and words 408 in document 402. For example, in annotation tool 902 2D geometry 904 is used to label line 1, and additional 2D geometries 908 and 910 are used to label words 1 and 2. In a similar manner 2D geometry 906 is used to label line 1 and additional 2D geometries 912 and 914 are used to label words 3 and 4. The results of the annotation tasks performed by the annotators may using annotation tool 902 may be organized into a knowledge tree 950 comprising structural elements 952 through 964, each of which are represented by different 2D geometries 504 and each of which are mapped via association elements 602 as different instances of elements of the customer-specified ontology 400. In this way, the annotation tool 902 causes annotators 122 to generate annotation data that is automatically formatted in accordance with the customer specified ontology 400.

FIG. 10 illustrates an example execution of an annotation workflow generated by an ontology-based annotation service to collect annotation data formatted in accordance with the customer-specified ontology, according to some embodiments.

In some embodiments, a workflow generated by annotation workflow generator 112 may be executed via annotation execution service 114 following a similar process as shown in FIG. 10. Though in some embodiments, various other suitable execution procedures may be used.

For example, at block 1004 a first step in executing annotation workflow 1002 is to generate annotation workflow task details, such as the annotation tool 902 shown in FIG. 9 that is generated based on the customer-specified ontology. In some embodiments multiple different annotation tools may be generated for different elements of an annotation workflow, such as different ontology levels. At block 1006 API inputs are created for the different annotation tasks.

At block 1008, a first set of annotation tasks may be created for a first level of an ontology that are to be execute using the created annotation tools, such as labeling lines, as shown for annotation tool 902. These tasks may be carried out using virtual or ephemeral computing resources 1030. For example, an ontology-based annotation service may be included in a provider network that also provides a virtual computing service and/or a code execution service using ephemeral computing resources, and the ontology-based annotation service may use such other service provider services to execute an annotation workflow. For example, annotation tasks 1032 through 1034 are performed by annotators 1050. At block 1010, it may be determined that the tasks for the first level of the ontology have been completed.

Then at block, 1012, a set of tasks for a second level of the customer-specified ontology, such as labeling words within lines, may be performed using virtual or ephemeral computing resources 1040 and annotators 1060. For example, virtual or ephemeral computing resources 1040 and annotators 1060 perform annotation tasks 1042 through 1044. In some embodiments, annotators 1050 and annotators 1060 may be a same or different set of annotators. At block 1014, it is determined that the tasks for the second (or $N^{th}$) level of the ontology have been completed.

Then at block 1016 post processing tasks are performed using virtual or ephemeral computing resources 1050, such as verification tasks 1052 and consolidation tasks 1054. The result of the verification and consolidation tasks may be a consolidation of the annotation data into a ground truth model (e.g., populated knowledge tree) that has an ontology that conforms to the customer-specified ontology.

Figure 11:
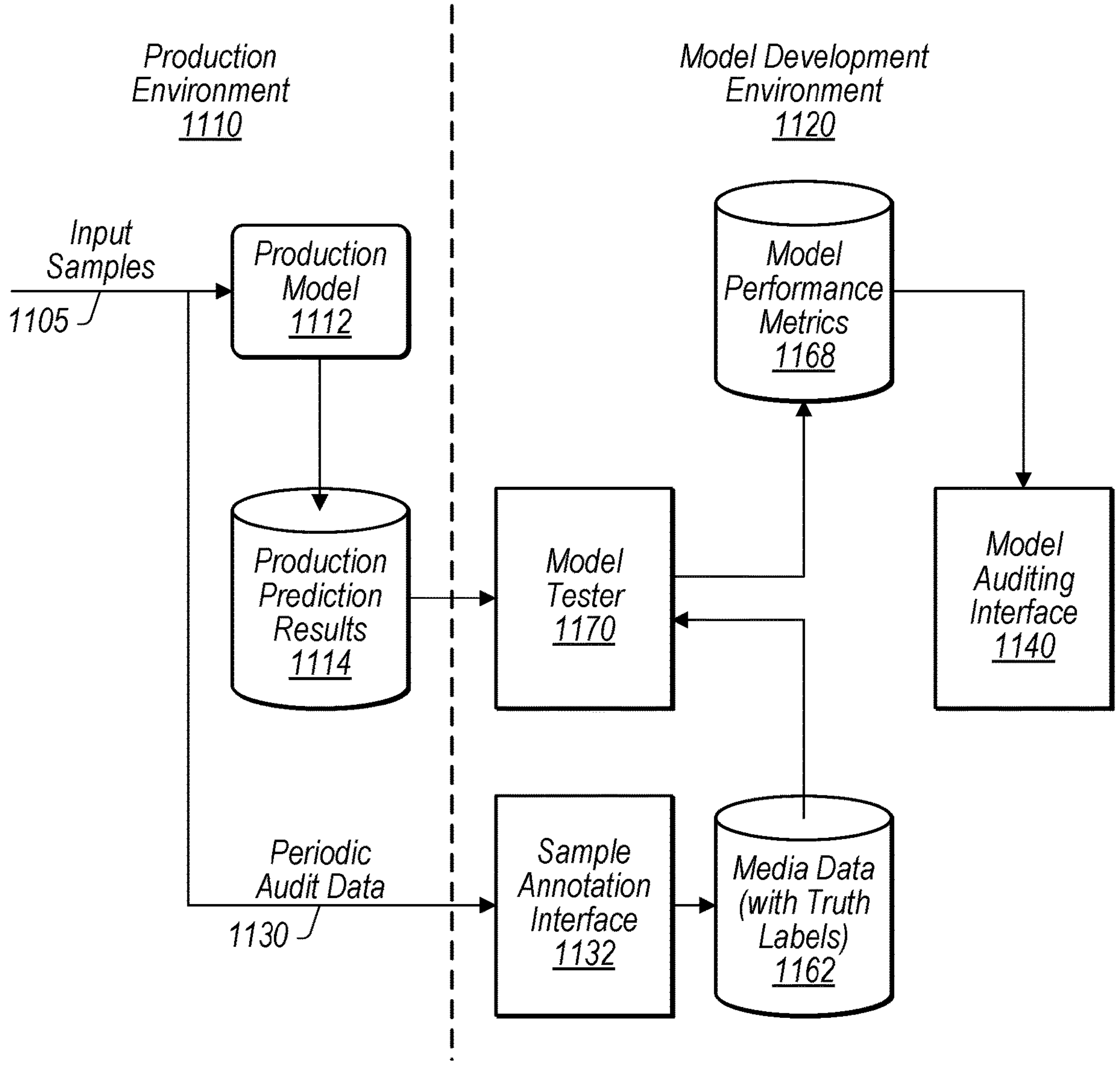
FIG. 11 illustrates some example uses of a populated model generated by an ontology-based annotation service, such as to train or validate a machine learning model, according to some embodiments.

FIG. 11 illustrates some example uses of a populated model generated by an ontology-based annotation service, such as to train or validate a machine learning model, according to some embodiments.

As shown, a production environment 1110 of a machine learning service is hosting a machine learning production model 1112, which may be operating to produce production prediction results 1114.

In some embodiments, periodic audit data 1130 may be obtained from the production environment 1110. In some embodiments, the audit data 1130 may be sampled from the input samples 1105 that are being consumed by the production model 1112.

As shown, the audit data 1130 may be provided to a sample annotation interface 1132, which may be linked to an ontology-based annotation service, such as ontology-based annotation service 102. As shown, samples annotated via the annotation interface 1132 are then stored in the media data store 1162. For example, a populated knowledge tree provided by ontology-based annotation service 102 may be stored in media data store 1162. The annotations are then used as the samples' truth labels for testing purposes.

As shown, in some embodiments, a model tester 1170 (or some other component in the model development environment 1120) may be used to generate model performance results for the production model, which may be stored in the model performance metrics store 1168. To generate performance metrics such as accuracy, precision, recall, etc., the model tester 1170 may compare the prediction results of the production model 1112 to the truth labels associated with the media samples.

As shown, in some embodiments, a model auditing interface 1140 is employed to display the audit results for the production model 1112.

Figure 12:
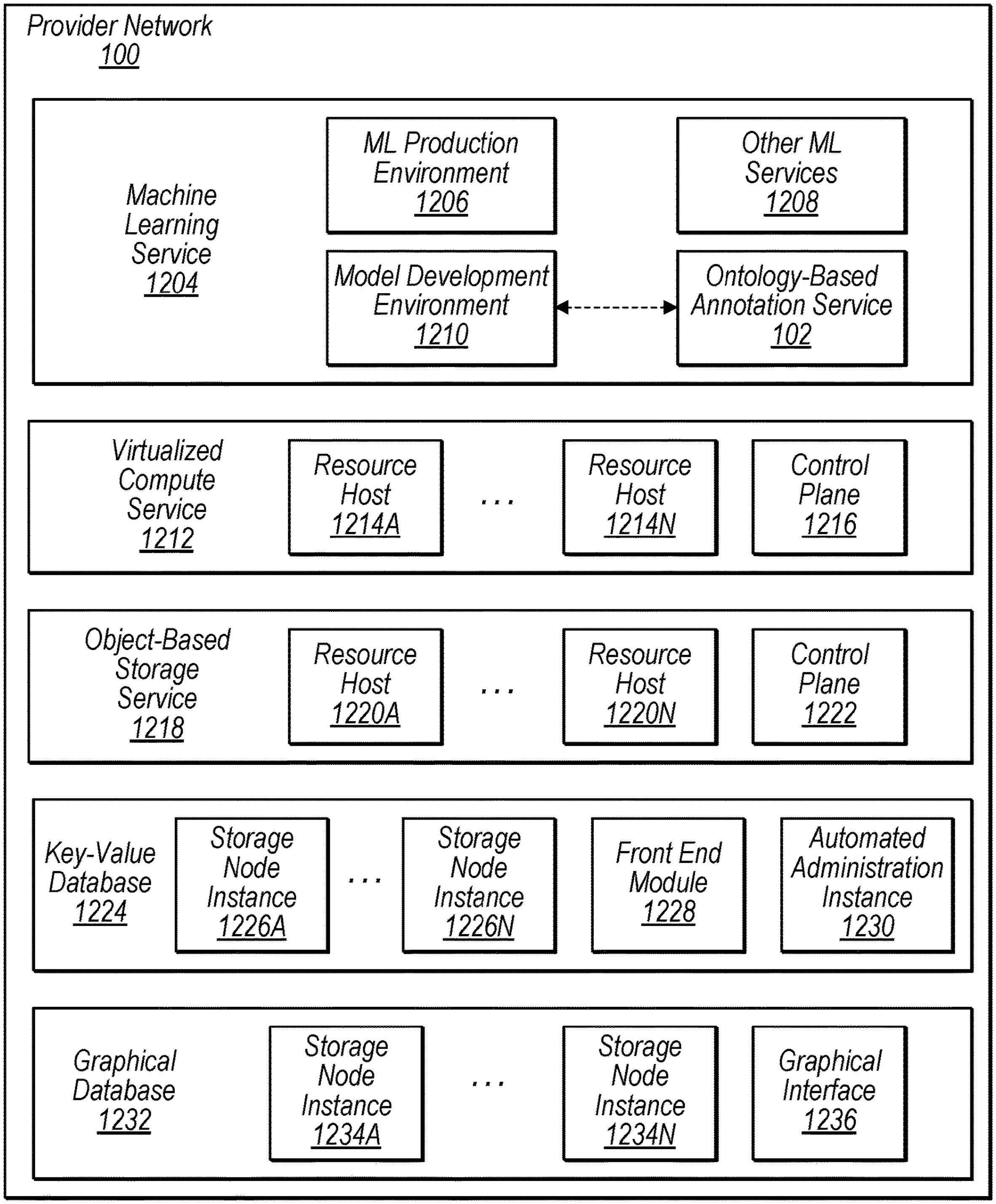
FIG. 12 illustrates an example provider network that includes an ontology-based annotation service (for example as a feature of a machine learning service) and which additionally includes other services, such as a key-value database or a graphical database, wherein the other services may be used to store or analyze annotation data collected using the ontology-based annotation service, according to some embodiments.

FIG. 12 illustrates an example provider network that includes an ontology-based annotation service (for example as a feature of a machine learning service) and which additionally includes other services, such as a key-value database or a graphical database, wherein the other services may be used to store or analyze annotation data collected using the ontology-based annotation service, according to some embodiments.

In some embodiments, a service provider network 100 may comprise a plurality of data centers located in different availability zones and connected via public or private network connections. Additionally, the service provider network 100 may be connected to customers via private or public network connections. In some embodiments, a service provider network 100 may provide various cloud-based services to customers of the service provider network, such as a machine learning service 1204, a virtualized computing service 1212, an object-based computing service 1218, a key-value database service 1224 (e.g., a NoSQL database service), a graphical database service 1232, and/or various other cloud-based services.

In some embodiments, an ontology-based annotation service 102 may be included as a service of a larger machine learning service 1204. The larger machine learning service 1204 may also include a machine learning production environment 1206 (such as production environment 1110 shown in FIG. 11) and model development environment 1210 (such as model development environment 1120 shown in FIG. 11). Additionally, machine learning service 1204 may include various other machine learning services 1208.

Additionally virtualized computing service 1212 (or a code executions service using ephemeral computing resources) may include resource hosts 1214A through 1214N and a control plane 1216. In some embodiments, aspects of the ontology-based annotation service 102 may be implemented using one or more virtual computing resources, such as virtual machines, provided by virtualized computing service 1212. Also, un-allocated computing capacity of resource hosts 1214A through 1214B may further be used as ephemeral computing resources to execute discrete tasks, such as annotation tasks, as described in FIG. 10.

In a similar manner object-based storage service 1218 may provide storage buckets for use in implementing ontology-based annotation service 102. In some embodiments, object-based storage service 1218 includes resource hosts 1220A through 1220N and control plane 1222. It should be noted that various ones of the resource hosts, control planes, etc. as described herein may be implemented using one or more computing devices, such as shown in FIG. 13.

In some embodiments, annotation data may be stored in object-based storage service 1218 and once consolidated into a populated knowledge tree, the annotation data may be stored in key-value database 1224 as JSON-LD data. Additionally, or alternatively, the populated knowledge tree may be stored in graphical database 1232. In some embodiments, key-value database 1224 includes storage node instances 1226A through 1226N along with front end module 1228 and automated administration instance 1230. Also, in some embodiments, graphical database 1232 includes storage node instances 1234A through 1234N, along with graphical interface 1236.

Figure 13:
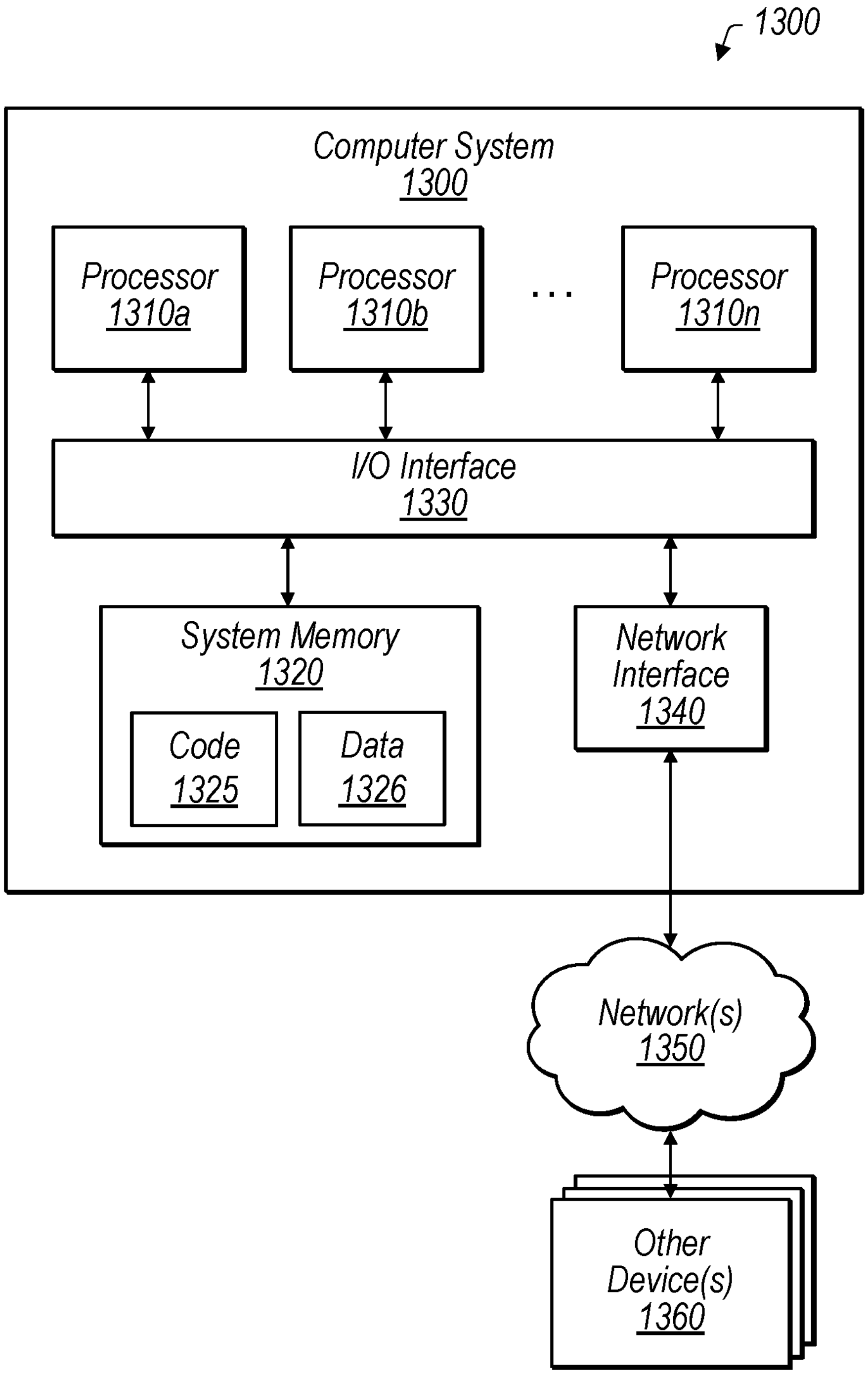
FIG. 13 illustrates an example computer system, that may be used to implement an ontology-based annotation service and/or other systems or services, as described herein.

FIG. 13 illustrates an example computer system, computer system 800, where computer system 1300 may be configured to implement different ontology-based annotation service implementations, resource hosts, control planes, or other components of service provider network services, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a mobile device, a consumer device, video game console, handheld video game device, application server, storage device, or in general any type of computing or electronic device.

Further, the systems and methods described herein may in various embodiments be implemented by any combination of hardware and software. For example, the methods may be implemented by computer system 1300 that includes one or more processors executing program instructions stored on a computer-readable storage medium coupled to the processors. The program instructions may be configured to implement the functionality described herein (e.g., the functionality of various servers and other components that implement the ontology-based annotation service described herein). The various methods as illustrated in the figures and described herein represent example embodiments of methods. The order of any method may be changed, and various elements may be added, reordered, combined, omitted, or modified.

Computer system 1300 includes one or more processors 1310*a*-1310*n* (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor, or a multiprocessor system including several processors (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g., Internet, LAN, etc.). For example, a client application executing on system 1300 may use network interface 1340 to communicate with a server application executing on a single server or on a cluster of servers that implement one or more of the components of the systems described herein. In another example, an instance of a server application executing on computer system 1300 may use network interface 1340 to communicate with other instances of the server application (or another server application) that may be implemented on other computer systems. Further, computer system 1300, via I/O interface 1330, may be coupled to one or more input/output devices 1350, such as cursor control device 1360, keyboard 1370, camera device 1390, and one or more displays 1380.

In the illustrated embodiment, computer system 1300 also includes one or more persistent storage devices and/or one or more I/O devices 1350. In various embodiments, persistent storage devices may correspond to disk drives, tape drives, solid state memory, other mass storage devices, or any other persistent storage device. Computer system 1300 (or a distributed application or operating system operating thereon) may store instructions and/or data in persistent storage devices, as desired, and may retrieve the stored instruction and/or data as needed. For example, in some embodiments, computer system 1300 may host a storage system server node, and persistent storage may include the SSDs attached to that server node.

Computer system 1300 includes one or more system memories 1320 that are configured to store instructions and data accessible by processor(s) 1310. In various embodiments, system memories 1320 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ bytecode, or in any other language such as C/C++, Java™, etc., or in any combination thereof. For example, in the illustrated embodiment, program instructions 1325 include program instructions executable to implement the functionality of an ontology-based annotation service and/or user interfaces for performing annotation tasks in different embodiments. In some embodiments, program instructions 1325 may implement multiple separate clients, server nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1335, which may be configured as described herein. In general, system memory 1320 (e.g., data store 1335 within system memory 1320), persistent storage, and/or remote storage may store data blocks, replicas of data blocks, metadata associated with data blocks and/or their state, configuration information, and/or any other information usable in implementing the methods and techniques described herein.

In one embodiment, I/O interface 1330 may be configured to coordinate I/O traffic between processor(s) 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor(s) 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor(s) 1310.

Network interface 1340 may be configured to allow data to be exchanged between computer system 1300 and other devices attached to a network, such as other computer systems (which may implement one or more virtual computing instances, ephemeral computing resources, storage system resource hosts, database engine head nodes or resource hosts, and/or clients of the systems described herein), for example. In addition, network interface 1340 may be configured to allow communication between computer system 1300 and various I/O devices 1350 and/or remote storage. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

one or more computing devices configured to:

receive, at an ontology-based annotation service, information defining an ontology for a particular type of machine learning problem;

automatically select or generate, by the ontology-based annotation service, based on the ontology, one or more annotation tools for generating annotation data;

automatically generate, by the ontology-based annotation service, based on the ontology, one or more annotation workflows for collecting the annotation data in accordance with the ontology;

coordinate, by the ontology-based annotation service, a plurality of computing resources to perform execution of the one or more annotation workflows using the one or more annotation tools to collect the annotation data in accordance with the ontology; and automatically populate, by the ontology-based annotation service, using the plurality of computing resources, a model for the machine learning problem with the annotation data, wherein the model is structured according to the received ontology.

2. The system of claim 1, wherein the one or more computing devices are further configured to:

map system supported structural elements to elements of the received ontology, and wherein to automatically populate the model for the machine learning problem with the annotation data, the plurality of computing resources implemented on the one or more computing devices are configured to:

collect, using the one or more annotation tools and the one or more annotation workflows, the annotation data in a format corresponding to a format of the received ontology; and generate a knowledge tree with the collected annotation data formatted in accordance with the received ontology.

3. The system of claim 1, wherein the information defining the ontology is communicated using a shape constraint language.

4. The system of claim 3, wherein the annotation data is formatted using a linked data object notation.

5. One or more non-transitory, computer-readable, media storing program instructions that, when executed using one or more processors, cause the one or more processors to:

receive, at an ontology-based annotation service, information defining an ontology;

automatically select or generate, by the ontology-based annotation service, based on the ontology, one or more annotation tools for generating annotation data;

automatically generate, by the ontology-based annotation service, based on the ontology, one or more annotation workflows for collecting the annotation data in accordance with the ontology;

coordinate, by the ontology-based annotation service, a plurality of computing resources to perform execution of the one or more annotation workflows using the one or more annotation tools to collect the annotation data in accordance with the ontology; and automatically populate, by the ontology-based annotation service, a model with the annotation data, wherein the model is structured according to the received ontology.

6. The one or more non-transitory, computer-readable, media of claim 5, wherein the program instructions, when executed using the one or more processors, further cause the one or more processors to:

generate a structure for a knowledge tree based on the received ontology, and wherein to automatically populate the model with the annotation data, the program instructions, when executed using the one or more processors, cause the one or more processors to:

collect the annotation data in a format corresponding to a format of the knowledge tree; and generate the knowledge tree with the collected annotation data.

7. The one or more non-transitory, computer-readable, media of claim 6, wherein structural elements of the knowledge tree are organized as a directed acyclic graph.

8. The one or more non-transitory, computer-readable, media of claim 5, wherein the information defining the ontology is formatted according to a shape constraint language.

9. The one or more non-transitory, computer-readable, media of claim 5, wherein the annotation data is formatted using a linked data object notation.

10. The one or more non-transitory, computer-readable, media of claim 5, wherein the one or more generated annotation tools comprise one or more of:

a form to be presented, via a user interface, to an annotator for use in generating the annotation data; or a graphical user interface with which an annotator interacts to generate the annotation data.

11. The one or more non-transitory, computer-readable, media of claim 10, wherein the form or the graphical user interface comprises one or more of:

an element for annotating text in an image being evaluated by the annotator;

an element for identifying an object in an image being evaluated by the annotator; or an element for identify a table in an image being evaluated by the annotator.

12. The one or more non-transitory, computer-readable, media of claim 11, wherein the respective elements comprise one or more sub-elements for annotating additional information about the text, the object, or the table, and wherein the elements and the sub-elements have relationship structures in accordance with the received ontology.

13. The one or more non-transitory, computer-readable, media of claim 5, wherein the program instructions, when executed using the one or more processors, further cause the one or more processors to:

cause the annotation data to be stored in a key-value database for the model.

14. The one or more non-transitory, computer-readable, media of claim 13, wherein the program instructions, when executed using the one or more processors, further cause the one or more processors to:

generate, based on the ontology, a graphical representation of the model in a graph-based database; and export the annotation data from the key-value database to the graph-based database.

15. A method, comprising:

receiving, at an ontology-based annotation service, information defining an ontology;

automatically selecting, by the ontology-based annotation service, based on the ontology, one or more annotation tools for generating annotation data;

automatically generating, by the ontology-based annotation service, based on the ontology, one or more annotation workflows for collecting the annotation data in accordance with the ontology;

coordinating, by the ontology-based annotation service, a plurality of computing resources to perform execution of the one or more annotation workflows using the one or more annotation tools to collect the annotation data in accordance with the ontology; and automatically populating, by the ontology-based annotation service, a model with the annotation data, wherein the model is structured according to the received ontology.

16. The method of claim 15, further comprising:

generating a structure for a knowledge tree based on the received ontology, and wherein said automatically populating the model with the annotation data comprises:

collecting the annotation data, using the one or more annotation tools, in a format corresponding to a format of the knowledge tree; and generating the knowledge tree with the collected annotation data.

17. The method of claim 16, wherein the information defining the ontology is formatted according to a shape constraint language.

18. The method of claim 17, wherein the annotation data is formatted using a linked data object notation.

19. The method of claim 18 wherein the shape constraint language is in accordance with a SHACL standard and wherein the linked data object notation is JSON-LD.

20. The method of claim 15, further comprising:

storing the collected annotation data in a key-value database; and exporting the collected annotation data to a graph-based database for analysis of the model.

* * * * *